(12) United States Patent
Warnock

(10) Patent No.: US 7,234,905 B2
(45) Date of Patent: Jun. 26, 2007

(54) APPARATUS FOR ATTACHING A HITCH TO A VEHICLE

(75) Inventor: K. Jeffrey Warnock, Victoria (CA)

(73) Assignee: Victoria Industries Limited, Victoria, British Columbia (CA)

( * ) Notice: Subject to any disclaimer, the term of this patent is extended or adjusted under 35 U.S.C. 154(b) by 0 days.

(21) Appl. No.: 11/061,393

(22) Filed: Feb. 18, 2005

(65) Prior Publication Data

US 2006/0188355 A1    Aug. 24, 2006

(51) Int. Cl.
B60P 7/08    (2006.01)
(52) U.S. Cl. .................. 410/80; 410/56; 410/156; 280/495; 280/423.1; 280/433
(58) Field of Classification Search .......... 410/56, 410/77, 80, 156; 280/495, 477, 901, 433, 280/434, 441.2, 491.5, 423.1, 415.1, 418.1
See application file for complete search history.

(56) References Cited

U.S. PATENT DOCUMENTS

| 599,245 | A | 2/1898 | Merrill |
|---|---|---|---|
| 725,662 | A | 4/1903 | Bohlen |
| 1,205,351 | A | 11/1916 | Johnson |
| 1,408,530 | A | 3/1922 | Pierce |
| 1,995,920 | A | 3/1935 | Gurton et al. |
| 2,078,492 | A | 4/1937 | Gurton et al. |
| 2,807,477 | A | 9/1957 | Tuso, Jr. |
| 3,561,076 | A | 2/1971 | Gunther |
| 3,729,214 | A | 4/1973 | Mulcahy et al. |
| 3,826,516 | A * | 7/1974 | Weber ................ 280/407 |
| 3,834,736 | A | 9/1974 | Dodgson |
| 3,917,314 | A | 11/1975 | Neal |
| 4,738,127 | A | 4/1988 | Johnson |
| 4,744,581 | A | 5/1988 | Cables |
| 4,960,288 | A | 10/1990 | Chambers |
| 4,997,218 | A | 3/1991 | Culling |
| 5,044,651 | A | 9/1991 | Weikel |
| 5,551,815 | A * | 9/1996 | Rainbow et al. ........... 410/58 |
| 5,772,229 | A | 6/1998 | Cattau |
| 5,839,745 | A | 11/1998 | Cattau et al. |
| 6,065,766 | A | 5/2000 | Pulliam |
| 6,161,402 | A | 12/2000 | Moore |
| 6,247,720 | B1 | 6/2001 | Linger et al. |
| 6,308,977 | B1 | 10/2001 | Pulliam et al. |
| 6,357,777 | B1 | 3/2002 | Linger et al. |
| 6,386,570 | B2 | 5/2002 | Linger et al. |
| 6,427,496 | B1 | 8/2002 | Hurst |
| 6,467,791 | B1 * | 10/2002 | Fandrich et al. ......... 280/491.5 |

(Continued)

Primary Examiner—Stephen Gordon
(74) Attorney, Agent, or Firm—Klarquist Sparkman, LLP

(57) ABSTRACT

An apparatus for attaching a hitch to a vehicle is provided. The apparatus includes a pin rotatably mountable to the hitch and having a handle for rotating the pin. A receptacle formed in the vehicle receives the pin. A locking site defined by a channel is formed in one of the pin and the receptacle. The channel extends about a longitudinal axis of the one of the pin and the receptacle. A bypass portion intersects the channel and extends longitudinally from the channel to an end of the one of the pin and the receptacle. A protrusion is formed on the other of the receptacle and the pin. The bypass portion permits insertion of the pin into the receptacle to align the locking site and the protrusion such that rotation of the pin lockably engages the protrusion in the locking site to attach the hitch to the vehicle.

19 Claims, 4 Drawing Sheets

U.S. PATENT DOCUMENTS

| | | |
|---|---|---|
| 6,502,846 B2 | 1/2003 | Fandrich et al. |
| 6,557,883 B2 | 5/2003 | Linger et al. |
| 6,682,089 B2 | 1/2004 | McCoy et al. |
| 6,685,210 B2 | 2/2004 | Lindeman et al. |
| 6,837,511 B1 * | 1/2005 | Johnson, III ................ 280/511 |

* cited by examiner

APPARATUS FOR ATTACHING A HITCH TO A VEHICLE

BACKGROUND OF THE INVENTION

1. Field of Invention

This invention relates to locking mechanisms and, in particular, apparatus for attaching a hitch to a vehicle.

2. Description of Related Art

Locking mechanisms, such as conventional hitch locks, are often used for attaching a hitch to a vehicle. Hitches are often releasably attached to a bed of the vehicle. Some conventional hitch locks use springs or other compressible biasing members to maintain the conventional hitch lock in a locking position or to meet other operational needs of the hitch lock. However, the inclusion of a spring or biasing member adds component costs and the effectiveness of the spring or biasing member may diminish over time.

Some conventional hitch locks use clips or the like, including cotter pins, to maintain a locking position. However, the use of such clips or the like increases component costs and may require the use of specialized tools for removal and insertion. Furthermore, such clips or the like may wear out unnoticed, thereby creating the risk of a sudden and unpredictable failure of the locking mechanism.

Other conventional hitch locks use operationally complicated locking mechanisms that involve a large number of components. However, such locking mechanisms require a user to perform a complicated multi-step procedure in order to operate the hitch lock, and have increased component costs.

SUMMARY

The above shortcomings may be addressed by providing an apparatus for attaching a hitch to a vehicle according to one aspect of the present invention. The apparatus includes a pin rotatably mountable to the hitch and having a handle for rotating the pin; a receptacle formed in the vehicle for receiving the pin; a locking site defined by a channel formed in one of the pin and the receptacle, the channel extending about a longitudinal axis of the one of the pin and the receptacle; a bypass portion intersecting the channel and extending longitudinally from the channel to an end of the one of the pin and the receptacle; and a protrusion on the other of the receptacle and the pin, whereby the bypass portion permits insertion of the pin into the receptacle to align the locking site and the protrusion such that rotation of the pin lockably engages the protrusion in the locking site to attach the hitch to the vehicle.

The pin may be formed with the channel and with the bypass portion and the receptacle may be formed with the protrusion. The channel may fully encircle the pin. The channel may have a generally circular cross-section. The bypass portion may be generally flat and extend transversely between longitudinally extending edges of the bypass portion. The bypass portion may form a slot longitudinally extending in the pin. The receptacle may include a wall defining an opening of the receptacle and the protrusion may project from the wall. The protrusion may form a flange having an edge extending substantially perpendicularly to the longitudinal axis of the opening. The protrusion may form a flange having an edge portion extending substantially parallel to the wall. The protrusion may project radially from the wall.

The receptacle may be formed with the channel and with the bypass portion and the pin may be formed with the protrusion. The protrusion may form a flange extending about the longitudinal axis of the pin. The protrusion may project radially from the pin. The receptacle may include a wall defining an opening of the receptacle and the channel is formed in the wall. The channel may fully encircle the opening. The channel may have a generally circular cross-section. The bypass portion may form a slot longitudinally extending in the wall.

The protrusion and the channel may be complementarily dimensioned. The pin may be captively attached to a flange of the hitch. The handle may be integrally connected to the pin and may project away from the longitudinal axis of the pin.

The apparatus may further include a frame attachable to the vehicle and having the receptacle attached thereto. The frame may include a tubular frame member having an aperture through a wall of the tubular frame member dimensioned to permit at least the bypass portion of the pin to pass through the aperture. The vehicle may include a vehicle aperture through the vehicle and the frame comprises an under-vehicle member operable to receive a fastener passing through the vehicle aperture to attach the frame to the vehicle. The receptacle may include a lock block dimensioned to be received within the tubular frame member. The lock block may include an opening such that the opening and the aperture of the tubular frame member are alignable when the lock block is received within the tubular frame member.

The apparatus, which includes the receptacle that may include the lock block, may be such that the protrusion may form a flange having an edge extending substantially perpendicularly to the longitudinal axis of the opening, the channel may fully encircle the pin and have a generally circular cross-section, the bypass portion may be generally flat and extend transversely between longitudinally extending edges of the bypass portion, the protrusion and the channel may be complementarily dimensioned, the pin may be captively attached to a flange of the hitch, the handle may be integrally connected to the pin and project away from the longitudinal axis of the pin, and such that the vehicle may include a vehicle aperture through the vehicle and the frame may include an under-vehicle member operable to receive a fastener passing through the vehicle aperture to attach the frame to the vehicle.

In accordance with another aspect of the invention, there is provided an apparatus for attaching a hitch to a vehicle. The apparatus includes insertion means rotatably mountable to the hitch and having a handle for rotating the insertion means; receiving means for receiving the insertion means, the receiving means being formed in the vehicle; locking means defined by a channel formed in one of the insertion means and the receiving means, the channel extending about a longitudinal axis of the one of the insertion means and the receiving means; bypass means intersecting the channel and extending longitudinally from the channel to an end of the one of the insertion means and the receiving means; and protruding means for lockably engaging the locking means, the protruding means being on the other of the receiving means and the insertion means, whereby the bypass means permits insertion of the insertion means into the receiving means to align the locking means and the protruding means such that rotation of the insertion means lockably engages the protruding means in the locking means to attach the hitch to the vehicle.

The apparatus may further include means for attaching the receiving means to the vehicle.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Aspects of the present invention are illustrated, merely by way of example, in the following drawings in which.

Similar reference numbers refers to similar features shown in the drawings.

DETAILED DESCRIPTION

Figure 1:
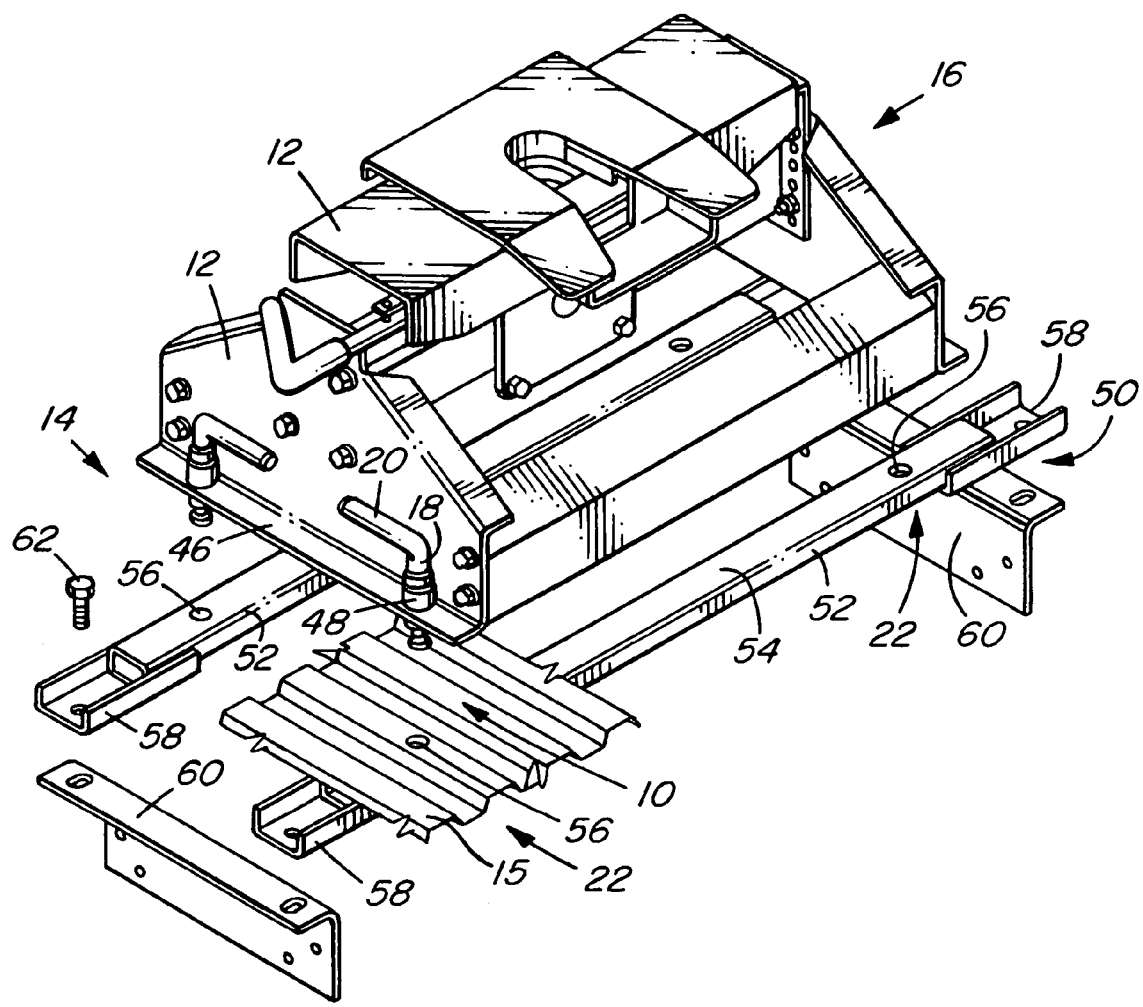
FIG. 1 is a perspective view of an apparatus for attaching a hitch to a vehicle, according to a first embodiment of the invention.

Referring to FIG. 1, an apparatus according to a first embodiment of the invention is shown generally at 10 and may be referred to as a pin lock 10. In an under-bed hitch mounting system shown generally at 16, pin lock 10 is used for attaching a hitch assembly 12 to a vehicle 14. A portion of a cargo bed 15 of the vehicle 14 is shown in FIG. 1.

Pin lock 10 provides insertion means rotatably mountable to the hitch assembly 12 and having a handle for rotating the insertion means. The insertion means shown in the Figures is in the form of a pin 18 rotatably mountable to the hitch assembly 12 formed with a handle 20 for rotating the pin 18.

Pin lock 10 provides receiving means for receiving the insertion means, the receiving means being formed in the vehicle 14. The receiving means shown in FIGS. 1 to 3 and 5 is formed with a receptacle 22 formed in the vehicle 14 for receiving the pin 18.

Figure 2:
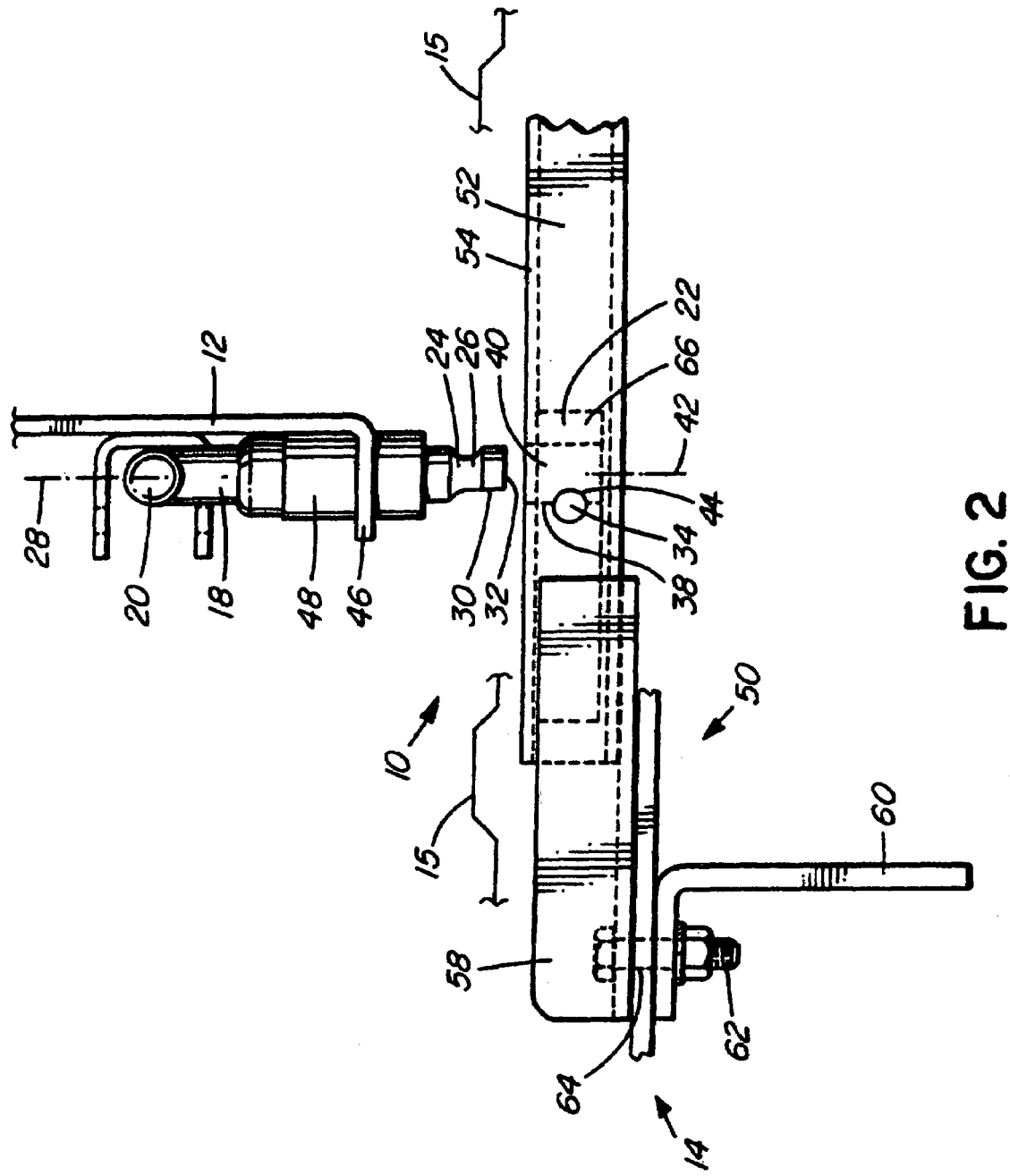
FIG. 2 is a detail elevation view of the apparatus shown in FIG. 1, showing the apparatus in a unlocking position and the hitch detached from the vehicle.
Figure 3:
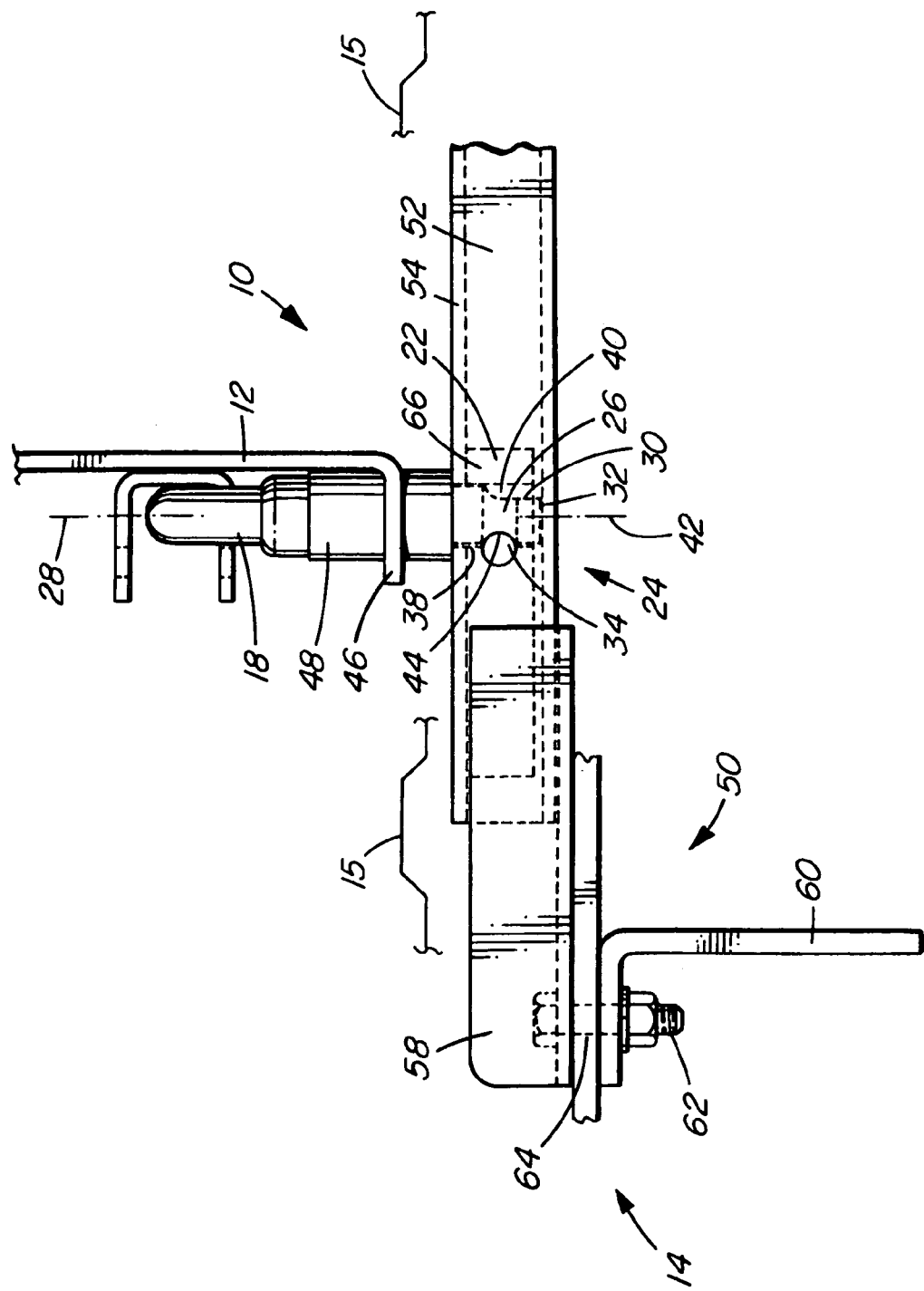
FIG. 3 is a detail elevation view of the apparatus shown in FIG. 1, showing the apparatus in a locked position and the hitch attached to the vehicle.

Pin lock 10 provides locking means defined by a channel formed in one of the insertion means and the receiving means, the channel extending about a longitudinal axis of the one of the insertion means and the receiving means. In the first embodiment, as shown in FIGS. 2 and 3, the locking means comprises a locking site 24 defined by a channel 26 formed in the pin 18 and extending about a longitudinal axis 28 of the pin 18.

Pin lock 10 provides bypass means intersecting the channel and extending longitudinally from the channel to the end of the one of the insertion means and the receiving means. In the first embodiment, as shown in FIGS. 2 and 3, the bypass means is in the form of a bypass portion 30 intersecting the channel 26 and extending longitudinally from the channel 26 to an end 32 of the pin 18.

Pin lock 10 provides protruding means for lockably engaging the locking means, the protruding means being on the other of the receiving means and the insertion means. In the first embodiment, as shown in FIGS. 2 and 3, the protruding means comprises a protrusion 34 formed in the receptacle 22.

The bypass means of pin lock 10 permits insertion of the insertion means into the receiving means to align the locking means and the protruding means such that rotation of the insertion means lockably engages the protruding means in the locking means to attach the hitch assembly 12 to the vehicle 14. In the first embodiment, as shown in FIGS. 2 and 3, the bypass portion 30 preferably permits insertion of the pin 18 into the receptacle 22 to align the locking site 24 and the protrusion 34. The channel 26 preferably permits rotation of the pin 18 to lockably engage the protrusion 34 in the locking site 24 to attach the hitch assembly 12 to the vehicle 14.

FIG. 2 shows an unlocking position of pin lock 10 in which the bypass portion 30 is aligned with the protrusion 34, thereby permitting the insertion or removal of the pin 18 into the receptacle 22. FIG. 3, in contrast to FIG. 2, shows a locked position of pin lock 10 in which the protrusion 34 is lockably engaging the locking site 24, thereby attaching the hitch assembly 12 to the vehicle 14. From the unlocking position shown in FIG. 2, pin lock 10 is moved to the locking position shown in FIG. 3 by inserting the pin 18 into the receptacle 22 until the locking site 24 and the protrusion 34 become aligned while maintaining the pin 18 positioned such that the bypass portion 30 passes adjacent to the protrusion 34. When the locking site 24 and the protrusion 34 are aligned, the pin 18 is then rotated until the protrusion 34 lockably engages in the locking site 24.

Releasing or unlocking pin lock 10 from the locking position is accomplished by a process that is the reverse of locking pin lock 10. In particular, pin lock 10 is moved from the locking position shown in FIG. 3 to the unlocking position shown in FIG. 2 by rotating the pin until the bypass portion 30 is adjacent the protrusion 34 and then pulling the pin 18 from the receptacle 22 while maintaining the pin 18 positioned such that the bypass portion 30 passes adjacent to the protrusion 34.

In the first embodiment, as shown in FIGS. 1 to 4, the channel 26 preferably fully encircles the pin 18 to permit the pin 18 to be rotated through a complete 180 degree arc, except where otherwise limited, when the locking site 24 and the protrusion 34 are aligned. As seen from the elevation view of FIGS. 2 and 3, the channel 26 has a circular cross-section or profile. The use of a circular cross-section for the channel 26 may result in lower manufacturing costs for the pin 18.

Figure 4:
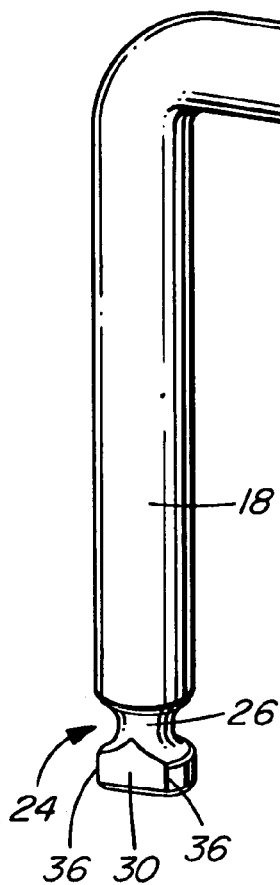
FIG. 4 is a detail perspective view of a pin of the apparatus shown in FIG. 1.

As shown in FIG. 4, the pin 18 has a circular cross-section and the bypass portion 30 is generally flat and extends transversely between longitudinally extending edges 36 of the bypass portion 30. Alternatively, the bypass portion 30 may form a slot longitudinally extending in the pin 18. In general, a variety of shapes and sizes of the bypass portion 30 will permit the insertion of the pin 18 into the receptacle 22 to align the locking site 24 and the protrusion 34.

As shown in FIGS. 2 and 3, the receptacle 22 includes a wall 38 defining an opening 40 of the receptacle 22 and the protrusion 34 projects from the wall 38. The opening 40 receives the pin 18 when the pin 18 is inserted into the receptacle 22 along the longitudinal axis 42 of the opening 40 substantially aligned with the longitudinal axis 28 of the pin 18. The opening 40 has a circular cross-section such that the single wall 38 circumscribes entirely the cylindrical opening 40. Alternatively, the opening 40 may have a variety of shapes, including irregular shapes and regular shapes such as, for example, rectangular, pentagonal, hexagonal, etc., the opening 40 being defined by several walls in such cases. The opening 40 has a diameter slightly larger than a cross-sectional diameter of the pin 18 to ensure a good fit between the opening 40 and the pin 18.

As shown in FIGS. 2 and 3, the protrusion 34 is formed as a flange 44 having an edge extending substantially perpendicularly to the longitudinal axis 42 of the opening 40. More particularly, the protrusion 34 may be a post or rod installed in the receptacle 22. All or a portion of the post may lie across the opening 40 so that the post extends across a chord of the cylindrical opening and projects radially into the opening. Alternatively, the flange 44 may have an edge portion that extends substantially parallel to the wall 38 by curving around inwardly of and adjacent the wall 38 about the longitudinal axis 42 of the opening 40. Alternatively or additionally, the protrusion 34 may project radially from the wall 38, including for example projecting radially to form a nub. In the embodiment of FIGS. 2 and 3, the flange 44 has a rounded cross-section. The flange 44, however, may have a variety of shapes and sizes such that the protrusion 34 permits the rotation of the pin 18 to lockably engage the protrusion 34 in the locking site 24.

As shown in FIGS. 2 and 3, the protrusion 34 and the channel 26 are complementarily dimensioned such that the protrusion 34 fits well in the channel 26. For example, a snug or even tight fit between the protrusion 34 and the channel 26 may act to prevent vibration, such as vibration of the vehicle 14, from causing pin lock 10 to work loose or self-unlock.

As shown in FIGS. 1 to 3, the hitch assembly 12 will preferably include a hitch flange 46 to which the pin 18 is attached. The hitch assembly 12 also includes a pin sleeve 48 to which the pin 18 may be captively attached to permit the pin 18 to rotate therethrough. Captively attaching the pin 18 to the hitch assembly 12 will prevent loss of the pin 18 when the hitch assembly 12 is not attached to the vehicle 14. Alternatively, the pin 18 may be easily removable from the pin sleeve 48, which may provide for separate and convenient storage of the pin 18 and the hitch assembly 12 when the hitch assembly 12 is not attached to the vehicle 14.

As shown in FIGS. 1, 2 and 4, the handle 20 of the pin 18 is preferably integrally connected to the pin 18, which may simplify the manufacturing and reduce manufacturing costs of the pin 18. The handle 20 may project away from the longitudinal axis 28 of the pin 18 to provide mechanical advantage to the user when locking and unlocking pin lock 10. In the first embodiment, the handle 20 has a similar cross-sectional shape to the rest of the pin 18. Alternatively, the handle 20 may have a cross-sectional shape that differs from the rest of the pin 18. For example, the handle 20 may have a cross-sectional shape that facilitates gripping of the handle 20 by the user (not shown). Alternatively or additionally, the handle 20 may extend radially from the longitudinal axis 28 of the pin 18 to form a knob (not shown) for gripping.

Figure 5:
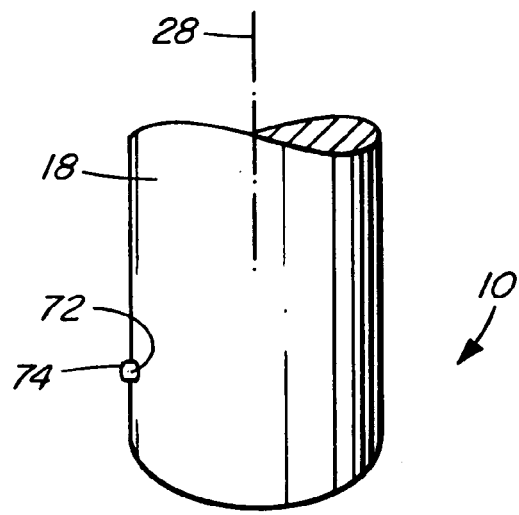
FIG. 5 is a detail perspective view of an apparatus for attaching a hitch to a vehicle, according to a second embodiment of the invention.
Figure 5:
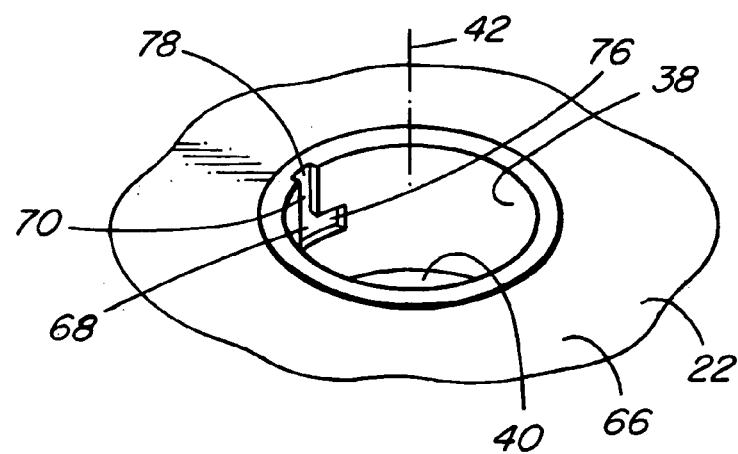

FIG. 5 shows a second embodiment of the present invention in which the receptacle 22 is formed with a channel 68 and a bypass portion 70, and the pin 18 is formed with a protrusion 72. The second embodiment is generally related to the first embodiment through a reversal of male and female locking components formed on the pin 18 and in the receptacle 22.

In the second embodiment as shown in FIG. 5, the protrusion 72 projects radially from the pin 18 to form a nub 74. Alternatively, the protrusion 72 may be formed as a flange, for example, extending about the longitudinal axis 28 of the pin 18. In general, the protrusion 72 may have a variety of shapes and sizes that will permit insertion of the pin 18 into the receptacle 22 when the longitudinal axes 28 and 42 are substantially aligned.

In the second embodiment, the wall 38 defining the opening 40 of the receptacle 22 is formed with the bypass portion 70 defined by a slot 78 longitudinally extending in the wall 38. The bypass portion 70 and the protrusion 72 may each have a variety of sizes, shapes and cross-sectional shapes, including having generally circular cross-sections, such that the bypass portion 70 permits insertion of the pin 18 into the receptacle 22 to align the protrusion 72 and a locking site 76 as shown in FIG. 5.

In the second embodiment, the wall 38 defining the opening 40 of the receptacle 22 is formed with the locking site 76 defined by the channel 68 that extends about the longitudinal axis 42 of the opening 40. Although not shown in FIG. 5, the channel 68 may fully encircle the opening 40 to permit the pin 18 to be rotated through a complete 360 degree arc, except where otherwise limited, when the locking site 76 and the protrusion 72 are aligned. The channel 68 and the protrusion 72 may each have a variety of cross-sectional shapes, including generally circular cross-sections, such that the channel 68 permits rotation of the pin 18 to lockably engage the protrusion 72 in the locking site 76 to attach the hitch assembly 12 to the vehicle 14.

In accordance with all embodiments of the present invention, the under-bed mounting system 16 preferably includes a plurality of pin locks 10. For example, each corner of the hitch assembly 12 shown in FIG. 1 is secured to the vehicle 14 by one pin lock 10.

Referring back to FIG. 1, pin lock 10 in accordance with all embodiments of the present invention may provide means for attaching the receiving means to the vehicle 14. Such means may include a frame shown generally at 50. The frame 50 is attachable to the vehicle 14 and the receptacle 22 is formed in the frame. The frame 50 of the vehicle 14 includes a pair of crossbars 52, each of which acts as a tubular frame member of the frame 50. Each crossbar 52 has a generally rectangular shape and a substantially hollow interior defined by crossbar walls 54. Each crossbar 52 includes a pair of crossbar apertures 56 through an upper crossbar wall 54.

Referring to FIGS. 1 to 3, the receptacle 22 is formed with a lock block 66 that includes the opening 40. The lock block 66 has dimensions such that it can be received within the hollow interior of each crossbar 52. The lock block 66 is preferably installed by inserting the lock block 66 into the interior of the crossbar 52 until the opening 40 and a corresponding crossbar aperture 56 become aligned. Such installation permits the pin 18 to be inserted into the lock block 66 after passing through the corresponding crossbar aperture 56, which preferably is dimensioned to receive the pin 18.

As shown in FIG. 1, the frame 50 preferably includes crossbar support brackets 58, each of which may be attachable to the frame 50 at an end of each crossbar 52. The frame 50 also includes a pair of under-vehicle frame brackets 60, each of which acts as an under-vehicle member for receiving a fastener 62 to attach the frame 50 to the vehicle 14. FIG. 1 shows the pair of crossbars 52 arranged parallel to each other and shows each of the pair of under-vehicle frame brackets 60 located below and at opposite ends of the pair of crossbars 52. A portion of the cargo bed 15 of the vehicle 14 is shown located between one crossbar support bracket 58 and the hitch assembly 12. Typically, the hitch assembly 12 fits inside the cargo bed 15, with different portions of the cargo bed 15 located between respective crossbars 52 and hitch assembly 12. Vehicle apertures (not shown) similar to the vehicle aperture 64 provide attachment points at each crossbar 52 for attaching the hitch assembly 12 to the frame 50.

Installing the frame 50 of the under-bed mounting system 16 may involve inserting fasteners such as the fastener 62 through accommodating apertures of the crossbar support brackets 58 and through corresponding accommodating apertures of the under-vehicle frame brackets 60.

While specific embodiments of the invention have been described and illustrated, such embodiments should be considered illustrative of the invention only. For example, the body of the pin 18 may have a variety of shapes and sizes that permit rotation of the pin 18 when the locking site 24 or 76 and the protrusion 34 or 72 are aligned. The specific embodiments of the invention should not be considered to limit the invention as construed in accordance with the accompanying claims.

The invention claimed is:

1. An apparatus for attaching a hitch to a vehicle, the apparatus comprising:
   a) a pin having a longitudinal axis rotatably mountable to the hitch and having a handle for rotating the pin;
   b) a receptacle formed in the vehicle for receiving the pin;
   c) a locking site defined by a channel extending about the longitudinal axis of the pin, the channel having a generally circular cross-section along a section substantially parallel to the longitudinal axis of the pin;
   d) a bypass portion intersecting the channel and extending longitudinally from the channel to an end of the pin; and
   e) a protrusion on the receptacle,
   whereby the bypass portion permits insertion of the pin into the receptacle to align the locking site and the protrusion such that rotation of the pin lockably engages the protrusion in the locking site to attach the hitch to the vehicle.

2. The apparatus of claim 1 wherein the pin is formed with the channel and with the bypass portion and the receptacle is formed with the protrusion.

3. The apparatus of claim 2 wherein the channel fully encircles the pin.

4. The apparatus of claim 2 wherein the bypass portion is generally flat.

5. The apparatus of claim 2 wherein the bypass portion forms a slot longitudinally extending in the pin.

6. The apparatus of claim 2 wherein the receptacle comprises a wall defining an opening having a longitudinal axis wherein the protrusion projects from the wall.

7. The apparatus of claim 6 wherein the protrusion forms a flange having an edge extending substantially perpendicularly to the longitudinal axis of the opening.

8. The apparatus of claim 6 wherein the protrusion forms a flange having an edge portion extending substantially parallel to the wall.

9. The apparatus of claim 6 wherein the protrusion projects radially from the wall.

10. The apparatus of claim 1 wherein the protrusion and the channel are complementarily dimensioned.

11. The apparatus of claim 1 wherein the pin is captively attached to a flange of the hitch.

12. The apparatus of claim 1 wherein the handle is integrally connected to the pin and projects away from the longitudinal axis of the pin.

13. The apparatus of claim 2 further comprising a frame attachable to the vehicle and having the receptacle attached thereto.

14. The apparatus of claim 13 wherein the frame comprises a tubular frame member having an aperture through a wall of the tubular frame member dimensioned to permit at least the bypass portion of the pin to pass through the aperture.

15. The apparatus of claim 14 wherein the receptacle comprises a lock block dimensioned to be received within the tubular frame member.

16. The apparatus of claim 15 wherein the lock block includes an opening having a longitudinal axis such that the opening and the aperture of the tubular frame member are alignable when the lock block is received within the tubular frame member.

17. The apparatus of claim 16 wherein the protrusion forms a flange having an edge extending substantially perpendicularly to the longitudinal axis of the opening, the channel fully encircles the pin, the bypass portion is generally flat, the protrusion and the channel are complementarily dimensioned, the pin is captively attached to a flange of the hitch, the handle is integrally connected to the pin and projects away from the longitudinal axis of the pin, and wherein the vehicle includes a vehicle aperture through the vehicle and the frame comprises an under-vehicle member operable to receive a fastener passing through the vehicle aperture to attach the frame to the vehicle.

18. An apparatus for attaching a hitch to a vehicle, the apparatus comprising:
   a) insertion means rotatably mountable to the hitch and having a handle for rotating the insertion means;
   b) receiving means for receiving the insertion means, the receiving means being formed in the vehicle;
   c) locking means defined by a channel formed in the insertion means, the channel extending about a longitudinal axis of the insertion means and having a generally circular cross-section along a section substantially parallel to the longitudinal axis of the insertion means;
   d) bypass means intersecting the channel and extending longitudinally from the channel to an end of the insertion means; and
   e) protruding means for lockably engaging the locking means, the protruding means being on the receiving means,
   whereby the bypass means permits insertion of the insertion means into the receiving means to align the locking means and the protruding means such that rotation of the insertion means lockably engages the protruding means in the locking means to attach the hitch to the vehicle.

19. The apparatus of claim 18 further comprising means for attaching the receiving means to the vehicle.

* * * * *